US009216767B2

(12) United States Patent
Garnweidner et al.

(10) Patent No.: US 9,216,767 B2
(45) Date of Patent: Dec. 22, 2015

(54) FRONT AXLE MOUNTING WITH CRASH GROOVES (71) Applicants: Peter Garnweidner, Lamprechtshausen (AT); Ernst Lindtner, Baden (AT); Hannes Halbauer, Theresienfeld (AT); Istvan Soproni, Sopran (HU); Thomas Vorisek, Eggendorf (AT)

(72) Inventors: Peter Garnweidner, Lamprechtshausen (AT); Ernst Lindtner, Baden (AT); Hannes Halbauer, Theresienfeld (AT); Istvan Soproni, Sopran (HU); Thomas Vorisek, Eggendorf (AT)

(73) Assignee: Magna International Inc., Aurora, Ontario (CA)

( * ) Notice: Subject to any disclaimer, the term of this patent is extended or adjusted under 35 U.S.C. 154(b) by 0 days.

(21) Appl. No.: 14/353,063

(22) PCT Filed: Nov. 5, 2012

(86) PCT No.: PCT/EP2012/004602
§ 371 (c)(1),
(2) Date: Apr. 21, 2014

(87) PCT Pub. No.: WO2013/064270
PCT Pub. Date: May 10, 2013

(65) Prior Publication Data
US 2014/0300136 A1 Oct. 9, 2014

Related U.S. Application Data (60) Provisional application No. 61/555,156, filed on Nov. 3, 2011.

(51) Int. Cl.
*B62D 21/00* (2006.01)
*B62D 21/15* (2006.01)
*B60R 21/013* (2006.01)
*B62D 25/08* (2006.01)
*F16F 7/12* (2006.01)
*B60R 19/18* (2006.01)
*B60R 21/00* (2006.01)

(52) U.S. Cl.
CPC ............ *B62D 21/155* (2013.01); *B60R 21/013* (2013.01); *B60R 2019/1886* (2013.01); *B60R 2021/0023* (2013.01); *B62D 21/152* (2013.01); *B62D 25/08* (2013.01); *F16F 7/12* (2013.01)

(58) Field of Classification Search
CPC ................ B62D 21/152; B62D 25/08; B60R 2019/1886; B60R 21/013; B60R 2021/0023; F16F 7/12
USPC .......................... 296/187.09, 203.02; 280/784
See application file for complete search history.

(56) References Cited

FOREIGN PATENT DOCUMENTS

DE  10357628 B3  2/2005
DE  102009041771 A1  3/2011

*Primary Examiner* — Joseph D Pape
*Assistant Examiner* — Dana Ivey
(74) *Attorney, Agent, or Firm* — Dickinson Wright PLLC (57) ABSTRACT A subframe (1) designed as a cross member for a vehicle includes two side members (2) and a stiffening structure (3) between the two side members (2), wherein the side members (2) are designed substantially as hollow profile pieces and have at least one predetermined buckling point (18, 19) in the form of a curvature in the longitudinal extension direction of the side members (2). In order to improve this subframe (1) so that it ensures good mechanical properties such as strength, rigidity, acoustics and reinforcement of the body while driving, and absorbs sufficient deformation energy in the event of a crash, and nevertheless can be produced easily and cost-effectively with a low component weight, the side members (2) have at least one bead (16, 17) extending in the longitudinal direction of the side members (2) in the area of the designed buckling point (18, 19).

13 Claims, 9 Drawing Sheets

(Prior Art)

FRONT AXLE MOUNTING WITH CRASH GROOVES

CROSS REFERENCE TO RELATED APPLICATIONS

This application claims the benefit of PCT International Application Serial No. PCT/EP2012/004602 filed on Nov. 5, 2012 and entitled "Subframe With Beads", which claims the benefit of U.S. Provisional Application Ser. No. 61/255,156 filed on Nov. 3, 2011 and entitled a "Front Axle Mounting With Crash Grooves", the entire disclosures of which are incorporated herein by reference.

The invention relates to a subframe designed as a cross member for a vehicle according to the preamble of claim 1.

Such subframes designed as a cross member, also referred to as suspension subframe, serve the attachment and support of ancillary equipment, for example steering or differential gears and engine bearers, and are mainly employed in passenger cars with an integral body and frame construction. They moreover provide mounting and linking points for the wheel suspension. Such subcarriers may be employed both in a front and a rear region of a vehicle, the subcarrier being screwed down to the body at the bottom side of the vehicle.

Rigidly screwed down subframes moreover serve to reinforce the vehicle body. In the event of a car crash, the subframe, as an additional load path, may at least partially absorb the forces acting on the vehicle by deformation.

DE 10 2009 041 771 A1 discloses a generic subframe. Said subframe essentially consists of two continuously formed, tubular side members which are connected to each other at one end by a crossbeam. Between the crossbeam and the other, opposite end of the side members, a single-shell stiffening element of a framework structure is screwed to the two side members. Said stiffening element comprises predetermined buckling points in the form of cross beads. In the event of a crash, the stiffening element will buckle downwards at these predetermined buckling points to avoid a blocking of the subframe.

With the currently known subframes, there is a problem in the event of a crash in that, while the stiffening element initially affords high resistance against deformation in its non-deformed state to reach a corresponding level of force and to be able to subsequently reduce crash or impact energy as deformation energy, the level of force and hence the possible energy reduction will rapidly fall as soon as the stiffening element starts to buckle. The crash behavior of the subframe can thus be only insufficiently controlled after the stiffening element has buckled.

The object underlying the invention is to improve existing subframes such that the latter ensure, on the one hand, good mechanical properties, such as strength, rigidity, acoustics or reinforcement of the body while driving, and on the other hand absorb sufficient deformation energy in the event of a crash and nevertheless may be produced with a low component weight and simultaneously easily and inexpensively.

This object is achieved with the subframe embodied as cross member having the features of claim 1.

Beads incorporated in the side member and extending, for example, in the longitudinal extension direction of the side members offer the possibility of optimizing the geometrical moment of inertia or the section modulus of the side member according to requirements. By attaching the beads in the region of the predetermined buckling point, the force progression may be kept within a given force corridor across the complete side member. The absorbed energy will be uniformly absorbed by the side members and uniformly distributed to the side members. The distance from the neutral axis to the extreme fiber is stabilized, and the side member may be manufactured with thin walls and with an only low height regarding the lightweight construction demanded in vehicle construction. Since the beads are incorporated in the region of predetermined buckling points designed as curvature in the side member, in particular the bending or buckling behavior of the side member in the event of a crash may be well influenced. The beads may moreover be easily incorporated into the side members in the manufacturing process of the side members. Moreover, the side member or the complete structural element may be of a structurally simple design.

It is conceivable for each side member to comprise at least two, and preferably exactly two, predetermined buckling points. Thus, the side members may deform approximately in a Z-shaped manner in the event of a crash, so that the impact energy is well converted into deformation energy by the side members by a mutual support of the limbs of the Z. Moreover, the passenger compartment may thus be advantageously protected from deformations.

It is conceivable that the respective side member comprises at least one bead at each predetermined buckling point. Thus, the geometrical moment of inertia of each predetermined buckling point may be increased largely independent of each other, permitting a good control of the crash behavior of the complete subframe.

Possibly, several beads may be arranged one next to the other at the side member in the region of a predetermined buckling point. Thereby, the forces introduced in a crash may advantageously act distributed to several beads, whereby the section modulus of the side member may be optimized.

Optionally, the beads may be disposed on the side of the side members located in the buckling direction of the predetermined buckling point, and/or on the side of the side members located opposed to the buckling direction of the predetermined buckling point. Depending on the side of the side member where the bead is located, the deformation behavior of the subframe may be advantageously adapted to desired conditions.

Possibly, the frame of the bead may extend in the buckling direction of the predetermined buckling point, and preferably in a direction opposed to the buckling direction of the predetermined buckling point. The design of the beads may thus be adapted to the available installation space, while the crash behavior may be well influenced at all times.

It is conceivable that a first predetermined buckling point is disposed in a side member in front of a second predetermined buckling point with respect to the direction of the force effect, the first predetermined buckling point having a stronger curvature then the second predetermined buckling point. The deformation behavior of the subframe may be influenced thereby such that the first predetermined buckling point located nearer to the vehicle's front will buckle earlier than the second predetermined buckling point located behind it in the direction of travel, contributing to an increased safety of the passenger compartment.

It is moreover conceivable that a bead has a length measured along the longitudinal extension of the side member which correlates with the degree of curvature of a predetermined buckling point, where a bead provided in the region of a first predetermined buckling point which is bent to a greater extent than a second predetermined buckling point is shorter than a bead provided in the region of the second predetermined buckling point. Thus, the buckling behavior of the respective side member may be well controlled despite a less distinct curvature of the predetermined buckling point. Moreover, by the length of the bead, the geometrical moment of inertia of the side member may be correspondingly adapted to a desired loading condition in the region of the respective predetermined buckling point.

It is conceivable that a bead comprises a width to be measured across the longitudinal extension direction of the side member, the width of the bead having approximately the width of the side member, preferably approximately three-quarter of the width of the side member, particularly preferred approximately half the width of the side member, and especially approximately one quarter of the width of the side member. Thus, the distance from the neutral axis to the extreme fiber of the side member may be easily and well influenced. Thereby, the geometrical moment of inertia of the side member in the region of the respective predetermined buckling point may be correspondingly adapted to a deformation behavior desired in the event of loading.

The side members may possibly have an approximately rectangular cross-section in the region of the predetermined buckling points. Thus, the stiffness of the side members against torsion may be kept high, and the side member may have, despite its low structural height, a good buckling behavior according to a deformation behavior desired in the event of loading.

The side members may be, for example, each integrally formed. Thus, the side members may be produced easily and inexpensively.

It is conceivable that the side members each are designed of multiple pieces, in particular of two half shells, both half shells being made of the same material, and preferably of different material qualities and wall thicknesses. The geometric moment of inertia or the section modulus of the complete side member may thus be advantageously influenced in combination with the beads according to a deformation behavior desired in the event of loading.

One possible embodiment of the invention will be illustrated with reference to the drawings. In the drawings.

Figure 1:
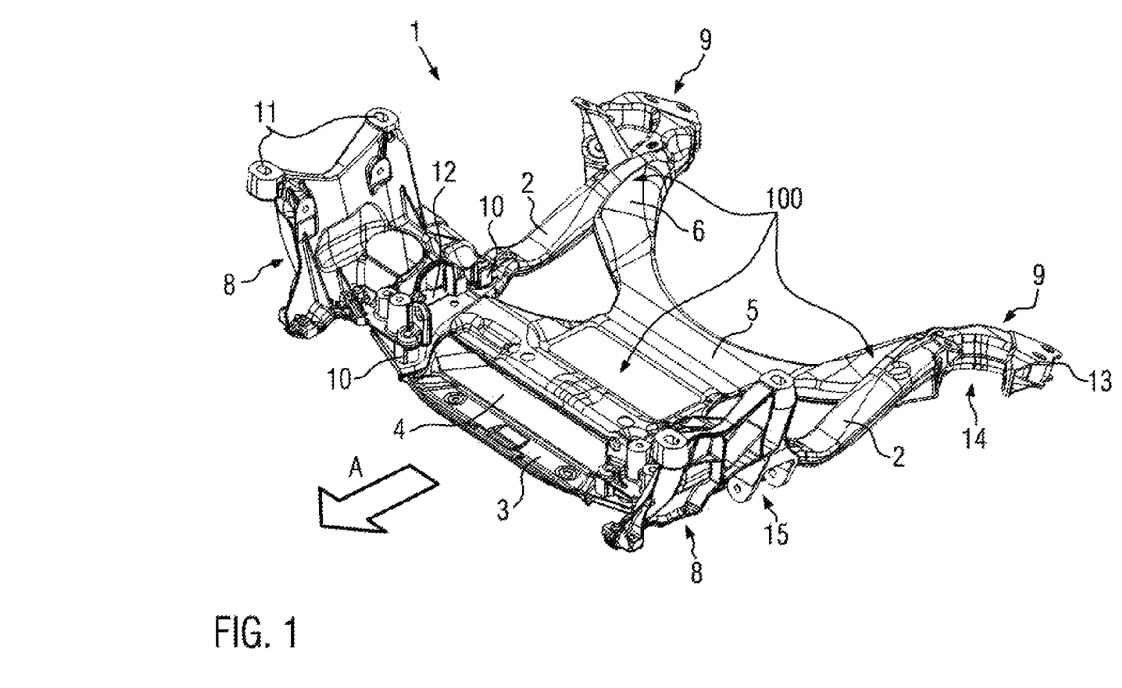
FIG. 1 shows a subframe according to the invention in a perspective view.
Figure 2:
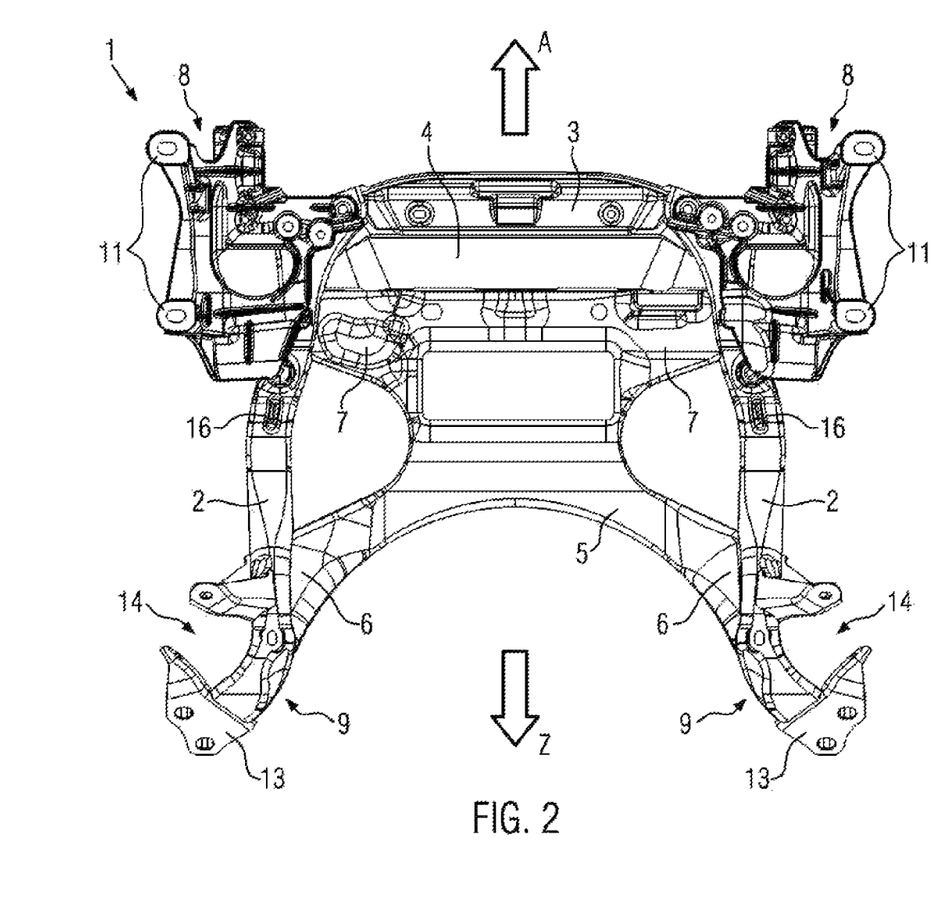
FIG. 2 shows a subframe according to the invention in a plan view.
Figure 3:
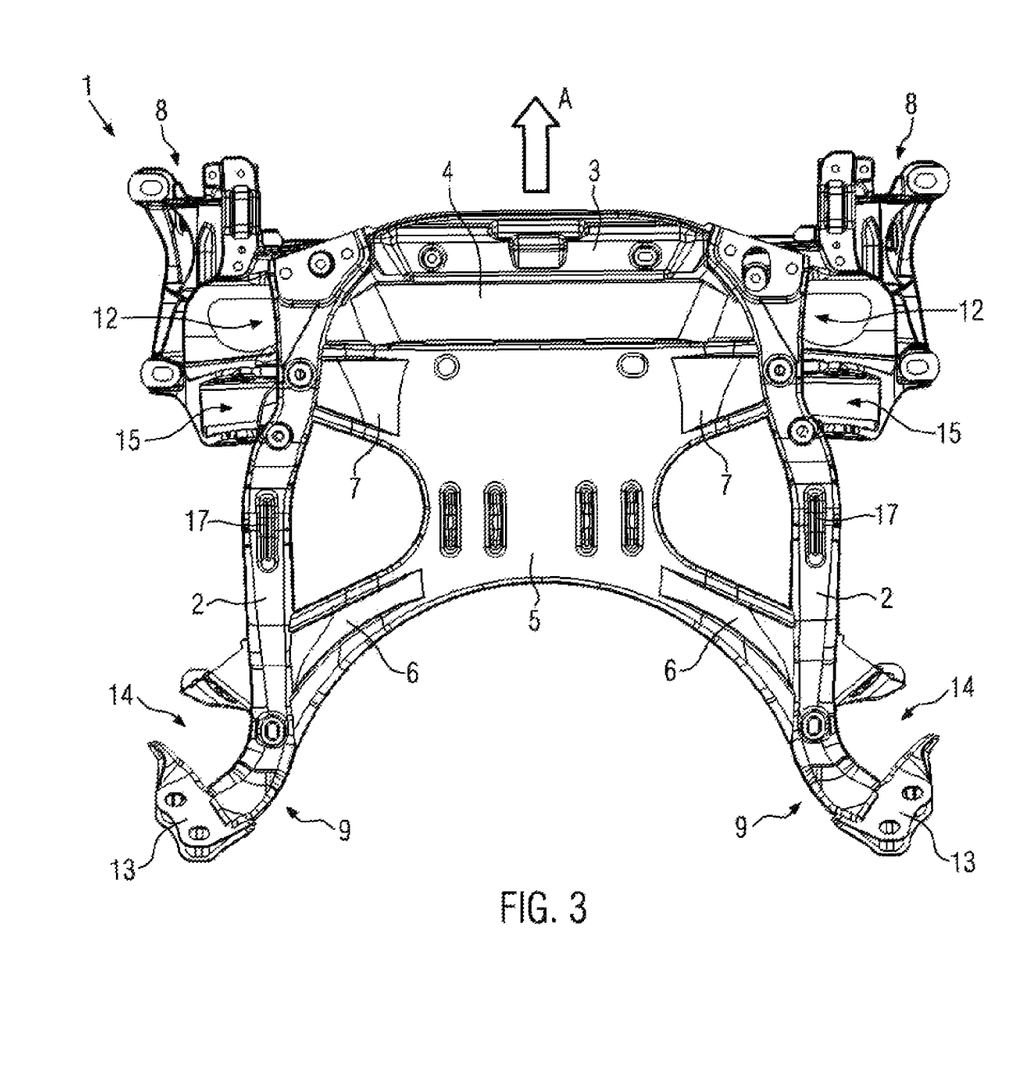
FIG. 3 shows a subframe according to the invention in a view from the bottom.

FIGS. 1, 2 and 3 show a subframe 1 according to the invention for the front of a motor vehicle. The arrow A drawn in FIG. 1 points into the direction of travel of the vehicle and thus illustrates the fitting position of the subframe 1. The expressions "front" and "rear" used below should be interpreted as relating to the direction of travel shown by arrow A.

The subframe 1 has two side members 2 extending longitudinally in the direction of travel. A crossbeam 3 is attached to a front section of the side members 2 and extends between the two side members 2. The crossbeam 3 is welded to the side members or preferably screwed to them.

Between the two side members 2, moreover an approximately X-shaped cross bridge 5 extends for stiffening purposes. The cross bridge 5 is connected with its ends 6, 7 on both sides each with one of the two side members 2, preferably via a welded joint. The cross bridge 5 is preferably designed as a two-shell steel sheet construction and stiffens the complete subframe 1.

Due to the connection between the side members 2 with the cross bridge 5, the side members 2 form, together with the cross bridge 5, a single-piece multi-shell structural element 100.

An underride protection 4 extends between the crossbeam 3 and the cross bridge 5. Said underride protection 4 moreover extends in the transverse extension direction between the two side members 2. The underride protection 4 may consist of plastics and be preferably screwed to the crossbeam 3. However, it is also possible for the underride protection 4 to be integrally formed with the crossbeam 3, preferably in the form of a sheet metal construction. The latter may then also be attached to the two side members 2, advantageously welded to them, and thus additionally reinforce the subframe 1.

Each of the two side members 2 has a node element 8 at its front end and a node element 9 at its rear end. The front node element 8 is designed as a casting, in particular as an aluminum casting, and screwed to the side member 2 by connection points 10. However, it is also conceivable for the front node element 8 to be designed, for example, as a sheet metal construction and, for example, be welded to the side member 2.

At an end remote from the side member 2, that means at an upper end or an end facing the vehicle body, the front node element 8 has two body connection points 11. Via these body connection points 11, the subframe 1 is connected to the body of the vehicle not represented here. At the body connection points 11, the subframe 1 is preferably screwed to the side members of the vehicle body extending over them and not being represented here.

The front node element 8 has an approximately tunnel-shaped cutout 12 between the two connection points 10. Through this cutout 12, the components of a steering of the vehicle, which are neither depicted here and extend transversely across the subframe 1, may be guided to the outside.

At a rear end of the side members 2 opposed to the front node element 8, said side members each comprise a rear node element 9. The rear node element 9 is preferably welded to the side member 2. The rear node elements 9 have a shape extending approximately like a bow to the vehicle's outer sides and to the bottom, that means towards the pavement. The rear connection element 13 of the node element 9 also serves for attaching the subframe 1 to the vehicle body. At the connection element 13, the subframe 1 is preferably screwed to the vehicle in the region of the side sillboard of the vehicle.

The subframe 1 has, in the region of the rear node element 9, a rear console 14 for receiving a section of a transverse link, in particular a triangular transverse link. In the region of the front node element 8, the subframe 1 has a front console 15 for receiving a further section of the transverse link.

FIG. 2 shows a plan view of the subframe 1. One can see that the side members 2 have, in the region of the rear node element 9, an approximately round, tubular cross-section. In the region of the front node element 8, the side members 2, however, have a compressed, approximately rectangular tubular cross-section. The transition from the approximately round to the approximately rectangular tubular cross-section is preferably continuous between the region of the rear node element 9 and the front node element 8.

One can furthermore see in FIG. 2 that the side member 2 has, at its upper side, a bead 16 which is disposed at least in sections in the region of the rectangular cross-section of the side member 2.

FIG. 3 shows a view of the subframe 1 from the bottom. One can see here that the side member 2 has, at its bottom side, a second bead 17 which is disposed at least in sections in the region of the approximately rectangular cross-section of the side member 2.

The subframe 1 serves, among other things, to convert the impact energy occurring in the event of a crash at least partially into deformation energy. Accordingly, the kinetic energy is converted into potential energy. The subframe 1 here acts as a girder subject to bending.

Figure 4:
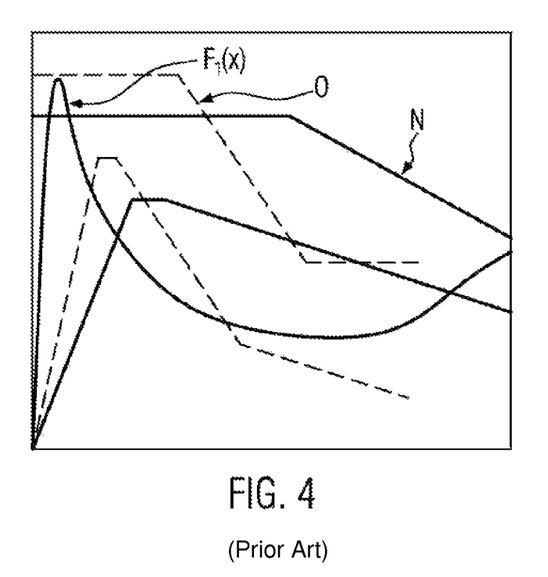
FIG. 4 shows a force-displacement graph showing the prior art.

FIG. 4 shows a force-displacement graph of a subframe known from prior art. The graph shows on the y-axis the force in Newton which is required to change the length of the subframe in case of deformation by the amount plotted on the x-axis in millimeters (displacement). The graph $F_1(x)$ represented in FIG. 4 shows this context between force and change of length in a case of equivalent load for the subframe known from prior art.

A desired deformation behavior of such subframes is determined by means of so-called "crash windows". FIG. 4 shows a first crash window O which is shown in dashed lines. One can see that the graph $F_1(x)$ extends within the crash window O at least in sections. The subframe represented by the graph $F_1(x)$ and known from prior art thus roughly corresponds to the requirements as to the deformation behavior determined by the crash window O in the event of a crash.

Seen from the zero point of the coordinate system, the graph $F_1(x)$ has a very steeply rising slope. Accordingly, in the event of a crash, a very high force is initially required to achieve an initial change of the length of the subframe. After the high point has been reached, the graph $F_1(x)$ descends with a steeply falling slope, which approximately corresponds to the specifications of the crash window O, although said falling slope is largely not located in the corridor of the crash window O.

The further progression of the graph $F_1(x)$ shows that for a further change of length of the subframe, an essentially smaller force is sufficient. This results from the fact that stiffening elements of well-known subframes have predetermined buckling points, so that the stiffening element will buckle downwards in the event of a crash. Thus, a high force is initially required to overcome the section modulus of the stiffening element. However, as soon as this section modulus is overcome, the buckling of the stiffening element starts, and the section modulus is thus considerably reduced. Thus, the further change of length of the complete subframe, as represented in FIG. 4, is effected with an essentially lower force.

FIG. 4 shows a further crash window N in solid lines. The corridor of this crash window N shows a new desired crash behavior. Compared to the crash window O, a smaller force is initially sufficient here for a greater change of length of the subframe. Further changes of length, however, require a higher force, which is expressed in the corridor of the crash window N extending more flatly along the X-axis.

Figure 5:
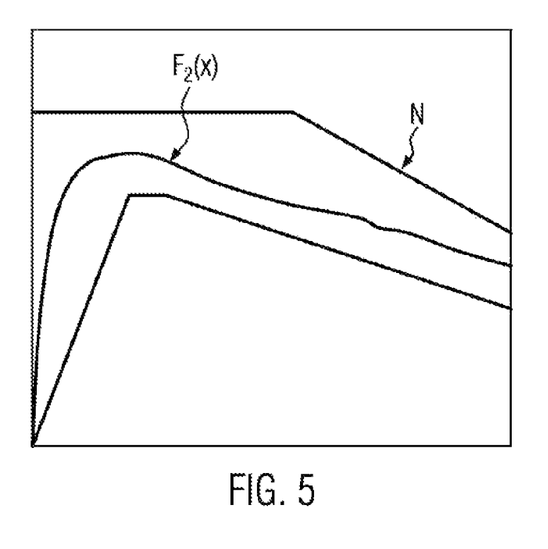
FIG. 5 shows a force-displacement diagram of the subframe according to the invention.

In FIG. 5, this new crash window N is represented again. The graph $F_2(x)$ depicted here represents the subframe 1 of the present invention. The graph $F_2(x)$ is located completely within the corridor of the new crash window N. Accordingly, the subframe 1 according to the invention has a desired deformation behavior represented by the crash window N. As will be illustrated more in detail below, this deformation behavior may be decisively influenced by the beads 16, 17 incorporated in the side member 2.

Figure 6:
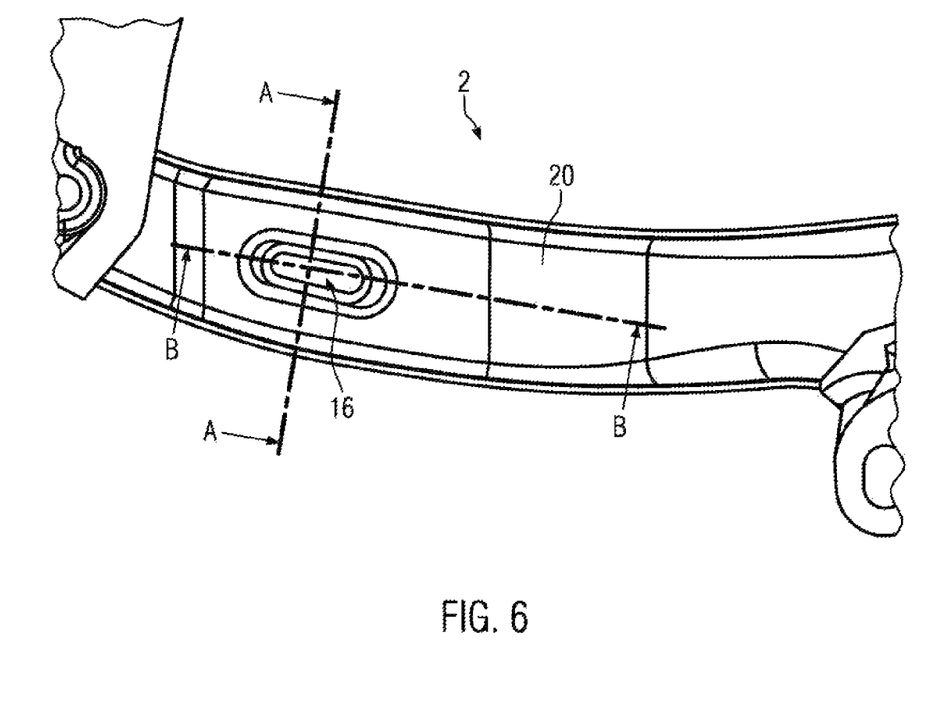
FIG. 6 shows a partial section of a side member of a subframe according to the invention in a plan view.

FIG. 6 shows a detail of a side member 2 of a subframe 1 according to the invention in a plan view. The bead 16 is located on the upper side 20 of the side member 2. The bead 16 extends approximately in the longitudinal extension direction of the side member 2.

Figure 7:
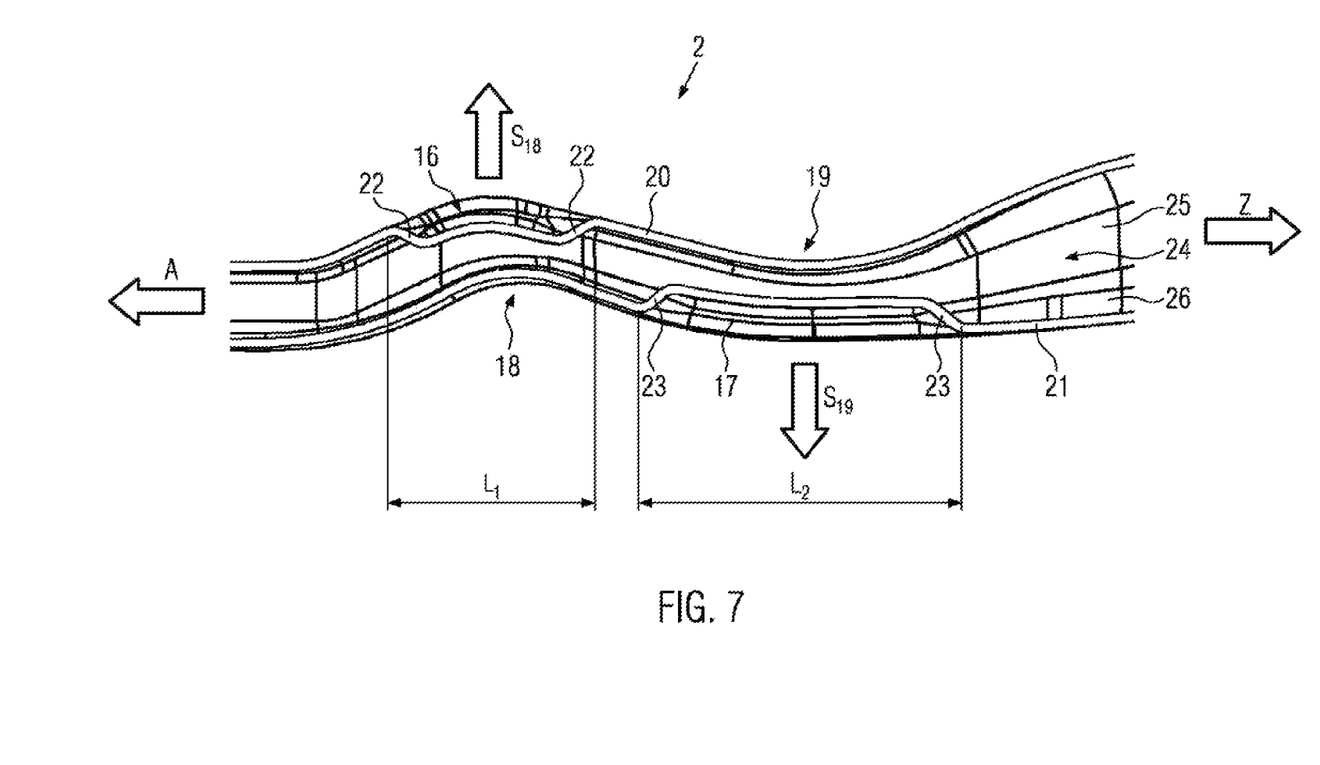
FIG. 7 shows a sectional view of the side member of FIG. 6 along an intersection line B-B.

FIG. 7 shows a section through the side member 2 along the intersection line B-B shown in FIG. 6. The side member 2 has two curvatures 18, 19 extending in the longitudinal extension direction of the side member 2. The curvature 18 is located, seen in the direction of travel A, in front of the second curvature 19. The two curvatures 18, 19 form a predetermined buckling point at which the side member 2 will start to buckle in the event of a crash. Since the first predetermined buckling point 18, which is disposed, in the direction of travel A, in front of the second predetermined buckling point 19, has a stronger curvature than the second predetermined buckling point 19, the first predetermined buckling point 18 will buckle earlier than the second predetermined buckling point 19 in the event of a crash.

Figure 10:
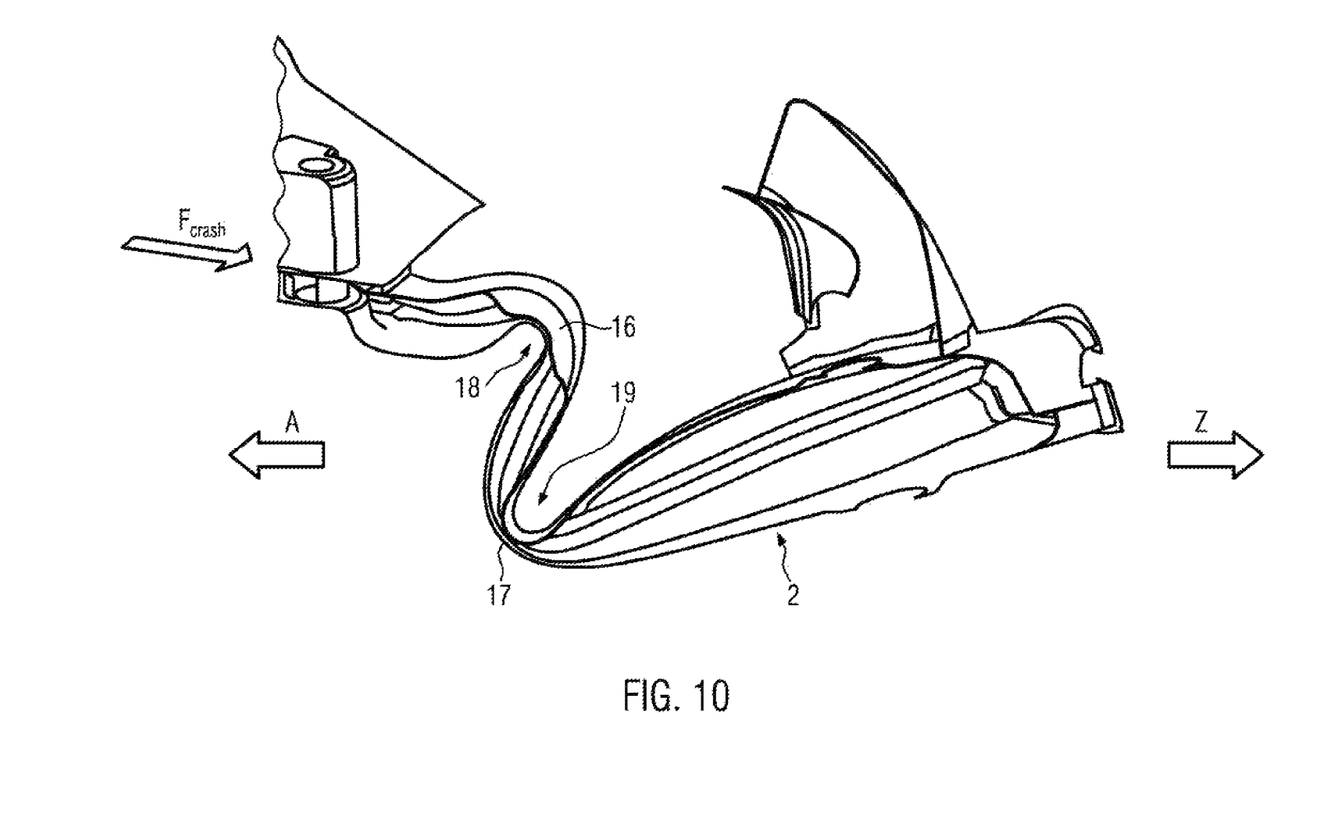
FIG. 10 shows a side member of a subframe according to the invention deformed after a crash.

Such an event of a crash is represented in FIG. 10. When a force, represented by the vector $F_{crash}$, acts on the side member 2, the latter will buckle first at the first curvature 18 and subsequently at the second curvature 19. So, the two curvatures 18, 19 form a predetermined buckling point. In the present case, the side member 2 collapses approximately in the form of a Z, where the section of the side member 2 which is located in the front with respect to the direction of the force effect $F_{crash}$ (here: in the direction of travel A) will be pushed, in the region of the first predetermined buckling point 18, over the rear section of the side member 2 located in the region of the second predetermined buckling point 19.

In FIG. 7, the directions of buckling of the two predetermined buckling points 18, 19 are indicated. In the event of a crash, the predetermined buckling point 18 will buckle to the top, that means in the direction of the arrow $S_{18}$. The predetermined buckling point 19 will buckle to the bottom, that means in the direction of the arrow $S_{19}$.

It will be understood that with a geometry of the curvatures 18, 19 mirrored by 180° in the longitudinal axis, the corresponding directions of buckling $S_{18}$, $S_{19}$ will correspondingly be reversed. Thus, the Z-shape would, in the event of a crash illustrated with reference to FIG. 10, also be reversed, and the front section of the side member 2 would be pushed under the rear section of the side member 2.

The bead 16 is disposed in the region of the first curvature 18, and the bead 17 is disposed in the region of the second curvature 19. In the shown embodiment, the beads 16, 17 are each lying on the side of the side member 2 located in the direction of buckling $S_{18}$, $S_{19}$ of the respective predetermined buckling points 18, 19. So, the bead 16 is lying on the upper side 20 of the side member 2, and the bead 17 is lying on the bottom side 21 of the side member 2.

It is also conceivable that the beads 16, 17 are disposed on the side of the side member 2 opposed to the direction of buckling $S_{18}$, $S_{19}$ of the respective predetermined buckling point 18, 19. It is moreover possible that beads are disposed on both sides 20, 21 of the side member 2.

Figure 8:
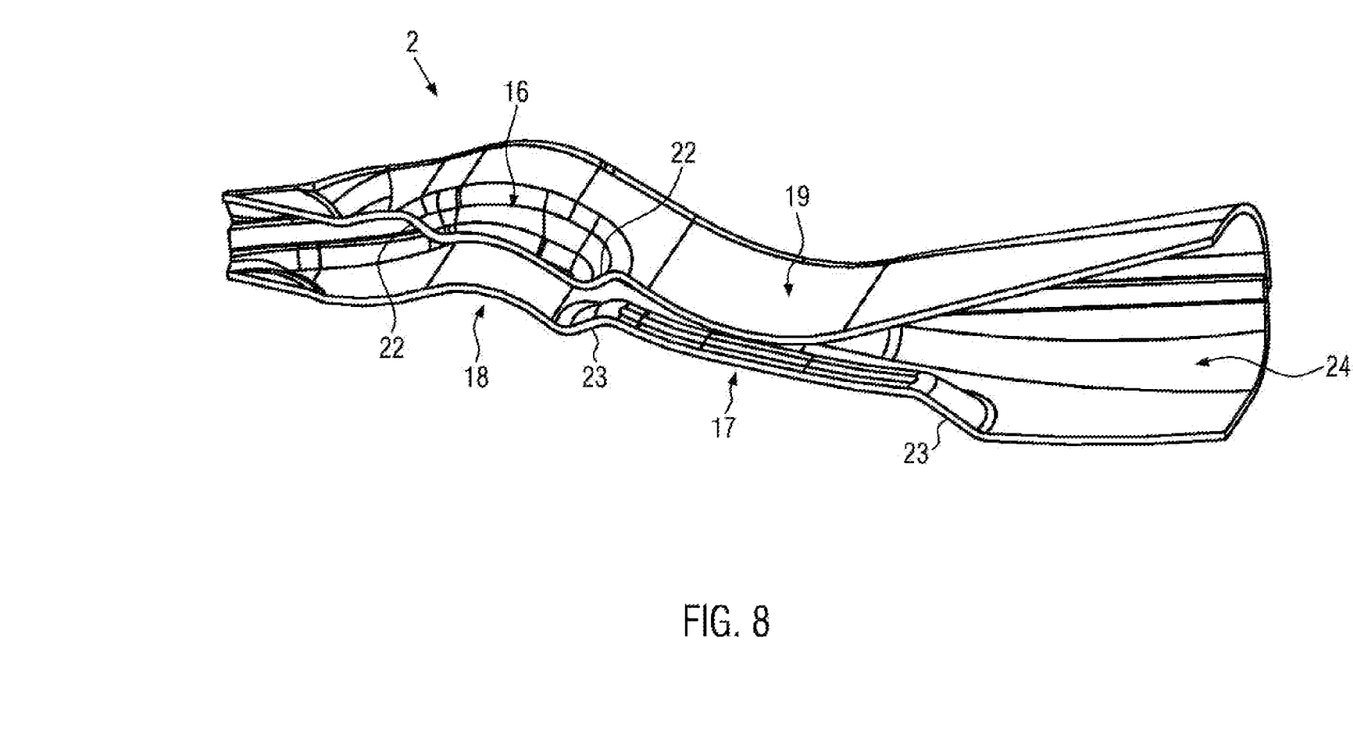
FIG. 8 shows a further sectional representation of a side member in a perspective view.

As can be in particular seen in FIGS. 7 and 8, the frame 22 of the bead 16 extends in a direction opposed to the direction of buckling $S_{18}$. The frame 23 of the bead 17 also extends in a direction opposed to the direction of buckling 10. In the embodiment, the frames 22, 23 accordingly extend into the interior 24 of the side member 2 designed as hollow profile.

The frames 22, 23, however, may also extend in the direction of buckling $S_{18}$, $S_{19}$. Here, it is not essential whether the respective bead 16, 17 is located on the upper side 20 or the bottom side 21 of the side member 2, or whether there are one or several beads each at the upper side 20 and the bottom side 21 at each predetermined buckling point 18, 19. The arrangement and characteristic of the beads is determined by the desired deformation behavior in the event of a crash.

One can furthermore see in FIG. 7 that the beads 16, 17 each have a length $L_1$, $L_2$ to be measured along the longitudinal extension of the side member 2 which correlates with the degree of curvature of the respective predetermined buckling point 18, 19. That means, the more distinct the curvature of the predetermined buckling point is, the shorter is the length of the bead formed at this point. In the present embodiment, the first predetermined buckling point 18 has a stronger curvature than the second predetermined buckling point 19. Accordingly, the length $L_1$ of the bead 16 is smaller than the length $L_2$ of the bead 17.

Figure 9:
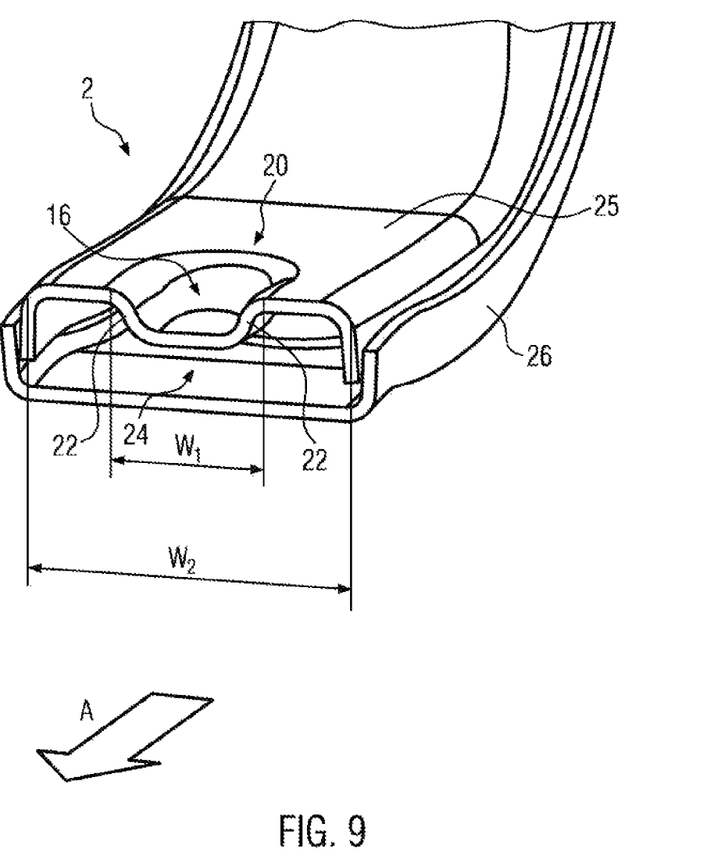
FIG. 9 shows a sectional view of the side member of FIG. 6 along intersection line A-A.

FIG. 9 shows a cross-sectional view of a side member 2 along the intersection line A-A illustrated in FIG. 6. The bead 16 is incorporated in the upper side 20 of the side member 2, and its frames 22 extend into the interior of the side member 2.

At the transition of the frames 22 to the upper side 20 each, a width $W_1$ of the bead 16 is measured. The side member 2 has a width $W_2$. In the embodiment shown in FIG. 9, the width $W_1$ of the bead 16 is approximately half the width $W_2$ of the side member 2.

By this ratio $W_1:W_2$, the distance from the neutral axis to the extreme fiber of the side member 2 designed as girder subject to bending, and thus its flexibility to deformation, may be adjusted. The more the width $W_1$ of the bead 16 approaches the width $W_2$ of the side member 2, the lower the distance from the neutral axis to the extreme fiber will become, and the geometrical moment of inertia of the side member 2 will increase. Thus, by the dimensioning of the beads 16, 17, the deformation behavior of the side member 2 at its predetermined buckling points 18, 19 may be influenced such that it corresponds, for example, to the desired specifications according to the crash window N shown in FIG. 5.

One can see in particular in FIGS. 7 and 9 that the side member 2 is embodied as a hollow profile. The side member 2 has an upper chord 25 and a lower chord 26 which are each designed as half shells. The upper chord 25 and the lower chord 26 are connected to each other, for example pressed to each other, as shown in FIG. 9. The upper and lower chords 25, 26, however, may also be welded or screwed to each other, or connected by other common joining processes.

The half shells 25, 26 shown in FIG. 9 consist of different materials. For example, the upper chord 25 may be made of high-strength aluminum, and the lower chord 26 may be made of steel plate, or vice-versa. It is also conceivable that the upper chord 25 is made of high-strength steel, for example to meet the desired strength properties, and the lower chord 26 is made of inexpensive steel plate, or vice-versa. However, it is also conceivable that the side member 2 designed as hollow profile is integrally formed and made, for example, by explosion or fluid forming.

The above-described embodiment was discussed by way of example with reference to a subframe 1 to be attached in the front region, that means in the region of the front axle of a vehicle. As mentioned in the beginning, however, it is also possible to attach the subframe 1 in the rear region, that means in the region of a rear axle of a vehicle.

It will be obvious to the person skilled in the art that with respect to the fitting position of the subframe 1, the direction of travel represented by the directional arrow A will be reversed in such a case. This is shown by way of example in FIGS. 2, 7 and 10 by the directional arrow Z. The force $F_{crash}$, which is also shown in FIG. 10 and will act on the subframe 1 in the event of a crash, however, remains unchanged.

What is claimed is:

1. A subframe (1) designed as a cross member for a vehicle, comprising:
   two side members (2) and a stiffening structure (4, 5) disposed between said two side members (2),
   each of the side members (2) having hollow profiles and including at least two predetermined buckling points (18, 19) in the form of a curvature extending in the longitudinal extension direction of the respective side member (2),
   wherein a first predetermined buckling point (18) is disposed in front of a second predetermined buckling point (19) with respect to the direction of the force effect ($F_{crash}$), the first predetermined buckling point (18) having a stronger curvature than the second predetermined buckling point (19), and
   at least one bead (16, 17) arranged in the region of each of the predetermined buckling points (18, 19) and extending in the longitudinal extension direction of the respective side member (2).

2. A subframe (1) according to claim 1, wherein each of the side members (2) include exactly two predetermined buckling points (18, 19).

3. A subframe (1) according to claim 2, wherein the at least one bead (16, 17) is arranged at each of the predetermined buckling points (18, 19).

4. A subframe (1) according to claim 1, wherein in the region of a predetermined buckling point (18, 19), several beads (16, 17) are arranged one next to the other at the side member (2).

5. A subframe (1) according to claim 1, wherein the beads (16, 17) are disposed each on the side of the side members (2) lying in a direction of buckling ($S_{18}$, $S_{19}$) of the predetermined buckling points (18, 19), and/or on the side of the side members (2) opposed to the direction of buckling ($S_{18}$, $S_{19}$) of the predetermined buckling points (18, 19).

6. A subframe (1) according to claim 1, wherein a frame (22, 23) of the bead (16, 17) extends in the direction of buckling ($S_{18}$, $S_{19}$) of the predetermined buckling point (18, 19), and preferably in a direction opposed to the direction of buckling ($S_{18}$, $S_{19}$) of the predetermined buckling point (18, 19).

7. A subframe (1) according to claim 1, wherein the side members (2) have, in the region of the predetermined buckling points (18, 19), an approximately rectangular cross-section.

8. A subframe (1) according to claim 1, wherein the side members (2) are each designed in multiple pieces, in particular of two half shells (25, 26), both half shells (25, 26) are comprised of the same material.

9. A subframe (1) according to claim 1, wherein the at least one bead (16, 17) has a width ($W_1$) to be measured transverse to the longitudinal extension direction of the side member (2), and wherein the width ($W_1$) of the at least one bead (16, 17) is approximately the width ($W_2$) of the side member (2).

10. A subframe (1) according to claim 1, wherein the at least one bead (16, 17) has a width ($W_1$) to be measured transverse to the longitudinal extension direction of the side member (2), and wherein the width ($W_1$) of the at least one bead (16, 17) is approximately three quarter of the width ($W_2$) of the side member (2).

11. A subframe (1) according to claim 1, wherein the side members (2) are each designed in multiple pieces, in particular of two half shells (25, 26), both half shells (25, 26) comprised of different materials.

12. A subframe (1) designed as a cross member for a vehicle, comprising:
two side members (2) and a stiffening structure (4, 5) disposed between said two side members (2),
each of the side members (2) having hollow profiles and including at least two predetermined buckling points (18, 19) in the form of a curvature extending in the longitudinal extension direction of the respective side member (2), and
at least one bead (16, 17) arranged in the region of each of the predetermined buckling points (18, 19) and extending in the longitudinal extension direction of the respective side member (2),
wherein the at least one bead (16, 17) has a length ($L_1$, $L_2$) to be measured along the longitudinal extension of the side member (2) which correlates with the degree of curvature of a respective predetermined buckling point (18, 19),
wherein a bead (16) is provided in the region of a first predetermined buckling point (18), which is bent to a greater extent than a second predetermined buckling point (19) and is shorter than a bead (17) provided in the region of the second predetermined buckling point (19).

13. A subframe designed as a cross member for a vehicle, comprising: (1),
two side members (2) and a stiffening structure (4, 5) disposed between said two side members (2),
each of the side members (2) having hollow profiles and including at least one predetermined buckling point (18, 19) in the form of a curvature extending in the longitudinal extension direction of the respective side member (2), and
at least one bead (16, 17) arranged in the region of the predetermined buckling point (18, 19) and extending in the longitudinal extension direction of the respective side member (2),
wherein the at least one bead (16, 17) has a width ($W_1$) to be measured transverse to the longitudinal extension direction of the side member (2), and wherein the width ($W_1$) of the at least one bead (16, 17) is approximately one quarter of the width ($W_2$) of the side member (2).

* * * * *